United States Patent
Narasimhan et al.

(10) Patent No.: US 6,611,945 B1
(45) Date of Patent: Aug. 26, 2003

(54) METHOD FOR PROPAGATING SWITCHING ACTIVITY INFORMATION IN DIGITAL COMBINATORIAL NETWORKS

(75) Inventors: Jagannathan Narasimhan, Millwood, NY (US); Amir Farrahi, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 09/696,718

(22) Filed: Oct. 25, 2000

(51) Int. Cl.[7] ............................................. G06F 17/50
(52) U.S. Cl. ............................................. 716/4; 716/5
(58) Field of Search ........................... 716/4, 5; 703/18, 703/22

(56) References Cited

U.S. PATENT DOCUMENTS 5,847,966 A * 12/1998 Uchino et al. ............... 364/489
5,966,523 A * 10/1999 Uchino .................. 395/500.23

OTHER PUBLICATIONS

Crenshaw et al, "Accurate High Level Datapath Power Estimation," IEEE. Mar. 1997, pp. 590–596.*
Costa et al, "A Probabilitic Approach for RT–Level Power Modeling," IEEE, Sep. 1999, pp. 911–914.*
Zhang et al, "Design and Synthesis of Low Power Weighted Random Pattern Generator Consideration Peak Power Reduction," IEEE, Nov. 1999, pp. 1–9.*
Wu et al, "A Note on the Relationship Between Signal Probability and Switching Activity," IEEE, Jan. 1997, pp. 117–120.*
Najim, "Transition Density: A New Measure of Activity in Digital Circuits", IEEE Transactions on Computer–Aided Design of Integrated Circuits and Systems, vol. 12, No. 2., Feb. 1993, pp. 310–323.
Chou, et al., "Estimation of Activity for Static and Domino CMOS Circuits Considering Signal Correlations and Simultaneous Switching", IEEE Transactions on Computer–Aided Design of Integrated Circuits and Systems, vol. 15, No. 10, Oct. 1996, pp. 1257–1265.
Marculescu, et al., "Probabilistic Modeling of Dependencies During Switching Activity Analysis", IEEE Transactions on Computer–Aided Design of Integrated Circuits and Systems, vol. 17, No. 2, Feb. 1998, pp. 73–83.

* cited by examiner

Primary Examiner—Vuthe Siek
(74) Attorney, Agent, or Firm—F. Chau&Associates, LLP

(57) ABSTRACT

A method is provided for computing signal and switching probabilities at an output of a logic circuit in a network having multiple logic circuits. The method for computing the signal and switching probabilities includes steps of creating a truth table for a logic circuit where the truth table has entries respectively corresponding to signals at inputs of the logic circuit, choosing in sequence one of entries each representing switching of a signal at the output of the circuit, determining whether a signal at an input corresponding to the chosen entry is at logic high, assigning an event probability representing that the signal is at logic high, and accumulating event probabilities respectively assigned to signals at inputs corresponding to the chosen entries to produce the signal probability at the output of the circuit.

35 Claims, 6 Drawing Sheets

| Function | Symbol | Output signal probability | Output switching probability |
|---|---|---|---|
| AND2 | a ⎯⟩&⎯ f  b | $p_a p_b$ | $p_a q_b + p_b q_a - \frac{q_a q_b}{2}$ |
| OR2 | a ⎯⟩≥1⎯ f  b | $p_a + p_b - p_a p_b$ | $(1-p_a)q_b + (1-p_b)q_a - \frac{q_a q_b}{2}$ |
| XOR2 | a ⎯⟩=1⎯ f  b | $p_1 + p_2 - 2 p_1 p_2$ | $q_a + q_b - 2 q_a q_b$ |
| ADD2 (Sum) | c, a, b → sum, $c_{out}$ | $p_a + p_b + p_c + 4 p_a p_b p_c - 2(p_a p_b + p_b p_c + p_a p_c)$ | $q_a + q_b + q_c + 4 q_a q_b q_c - 2(q_a q_b + q_b q_c + q_a q_c)$ |
| ADD2 ($C_{out}$) | | $p_a p_b + p_a p_c + p_b p_c - 2 p_a p_b p_c$ | $q_a q_b q_c - \frac{1}{2}(q_a q_b + q_b q_c + q_a q_c) + q_a(p_b + p_c - 2 p_b p_c) + q_b(p_a + p_c - 2 p_a p_c) + q_c(p_a + p_b - 2 p_a p_b)$ |
| MUX2 | a→0, b→1, C → f | $p_a(1-p_c) + p_b p_c$ | $(p_a + p_b - 2 p_a p_b - \frac{q_a + q_b}{2})q_c + p_c(q_b - q_a) + q_a$ |

Fig. 4

METHOD FOR PROPAGATING SWITCHING ACTIVITY INFORMATION IN DIGITAL COMBINATORIAL NETWORKS

BACKGROUND OF THE INVENTION

1. Field of the Invention

The present invention relates to a method for propagating switching activity information in a digital network, and more particularly to a method for computing and propagating signal and switching probabilities through components in a combinatorial logic circuit.

2. Description of the Related Art

In electronic systems, power consumption is one of the factors determining efficiency and functionality of the system. With the proliferation of wireless and hand-held electronic devices such as palm top computers, cellular telephones, etc., power consumption has become an important factor to be considered in designing and manufacturing such electronic devices. Since power consumption of such electronic devices directly relates to battery size and duration of usage of the devices between charges, battery life has become one of the most important factors in such electronic devices.

To choose a battery for an electronic device, the expected power consumption of the electronic device has to be accurately computed. In order to design power-efficient electronic devices, it is necessary to estimate and optimize power consumed in each component (i.e., IC) of an electronic device. Accurate computation of power consumption can improve battery life by enabling the design process to alleviate power-related problems in an electronic device, such as electron migration, circuit timing degradation due to voltage drops, hot-electron degradation, etc.

For fabrication of logic circuits in electronic devices, complementary metal oxide silicon (CMOS) technology is most commonly used. For CMOS devices, a primary source of power consumption is "dynamic power". Dynamic power is the power consumed when signals at inputs or output(s) of the CMOS circuit switch from one logic state to another logic state, for example, from logic "0" to logic "1" or from logic "1" to logic "0".

A logic network performing a predetermined logic function may have a set of logic circuits each of which operates in accordance with a certain logic function. In such a logic network, a combinatorial logic function is performed by implementing a logic function of each logic circuit. Thus, to compute power consumed in such a logic network, it is necessary to compute power consumed in each of the logic circuits.

For computation of dynamic power (or switching power) in a logic circuit, it is necessary to compute the number of logic transitions per unit time of a signal at each node in the logic circuit. In terms of quantity, the number of logic transitions per unit time of a signal at Node i is called "switching probability ($q_i$)". In a synchronous digital network, switching probability ($q_i$) represents a fraction of clock cycles during which a signal at Node i makes a transition.

Another quantitative term related to the switching probability ($q_i$) is "signal probability ($p_i$)" at Node i. Signal probability ($p_i$) represents a fraction of time during which a signal at Node i has a value of logic "1". The signal and switching probabilities ($p_i$, $q_i$) at Node i are among quantities that are collectively known as "signal statistics" of a signal at Node i.

Since dynamic power consumed in a logic circuit is substantially equal to summation of switching powers consumed in all the nodes of the logic circuit during transitions of signals at the nodes, power consumed in the logic circuit can be computed from the following equation:

$$Power = \sum_i C_i V^2 q_i \qquad (1)$$

where, "$C_i$" is load capacitance, "V" is amount of voltage swing between logic "0" and logic "1", and "$q_i$" is switching probability at Node i. In Equation (1), a product of $C_i$, $V^2$, and $q_i$ is calculated with respect to Node i, and the summation is taken over all the nodes in the logic circuit.

To compute power consumed in a logic circuit using Equation (1), it is necessary to have values of switching probabilities at all nodes in the logic circuit. Assuming that signal statistics, including switching probabilities, at inputs of a logic circuit are known, power consumed in the logic circuit can be obtained using Equation (1) by computing switching probabilities at all nodes in the logic circuit. Such computation of switching probabilities at all the nodes can be accomplished by propagating the signal statistics at inputs of the logic circuit through various Boolean functions constituting a combinatorial function of the logic circuit. Thus, signal statistics of a logic circuit obtained from such a propagation depends on each Boolean function (1) and signal statistics at inputs of the logic circuit.

Conventional methods for propagating signal statistics, including signal and switching probabilities, into a logic circuit are disclosed, for example, in "Transition Density: A New Measure of Activity in Digital Circuits", by F. Najm, February 1993, IEEE, Vol. 12, No. 2, pp. 310–323 (hereinafter "Najm"); and "Estimation of Activity for Static and Domino CMOS Circuits Considering Signal Correlations and Simultaneous Switching", by T. Chou and K. Roy, October 1996, IEEE, Vol. 15, No. 10, pp. 1257–1264 (hereinafter "Chou et al.").

Najm discloses formulas to compute signal and switching probabilities at the output of a node in the logic circuit using signal and switching probabilities at the inputs of the node. Najm assumes that input signals of a logic circuit are statistically independent and that only one of the input signals may make a transition at any given time.

Chou et al., mentioning that the formulae proposed by Najm have limitations in handling simultaneous switching of input signals of a node, proposes a method for more accurately propagating signal and switching probabilities into a logic circuit by extending the result in Najm. In "Probabilities Modeling of Dependencies During Switching Activity Analysis", by Marculescu et al., February 1998, IEEE, Vol. 17, No. 2, pp. 73–83, the method (formulae) proposed by Chou et al. has been modeled in terms of Markov processes to provide a solution for propagation of signal and switching probabilities considering spatial-temporal correlations in analysis of the propagation.

However, the conventional methods for propagating signal and switching probabilities at inputs into a logic circuit are difficult to apply in practice for computing power consumed in the logic circuit. For example, in a simulation of propagating signal and switching probabilities through a network using the conventional methods, vectors are obtained at inputs of the network and then used for computing signal and switching probabilities at each of intermediate inputs and outputs of the network. Such a simulation is a time consuming and costly process. The Markov based process or the Boolean difference based process leads to highly complex computations in implementing the propagation of signal and switching probabilities.

Therefore, a need exists for a method for propagating signal and switching probabilities at inputs through a logic network by using a less complex and less time-consuming method of computing signal and switching probabilities with respect to each of logic circuits in the logic network. Further, it will be advantageous to provide a method for estimating and optimizing power consumed in a logic network using the propagation of signal and switching probability through the logic network.

OBJECTS AND SUMMARY OF THE INVENTION

It is an object of the present invention to provide a method for computing and propagating signal and switching probabilities through logic circuits in a combinatorial network to obtain signal and switching probabilities at output of the network.

It is another object of the present invention to provide a method for estimating power consumed in a logic circuit using the method of propagating signal and switching probabilities through the logic circuit.

It is still anther object of the present invention to provide a method for optimizing power consumed in a logic circuit using the method of power estimation and propagation of signal and switching probabilities.

To achieve the above and other objects, the present invention provides a method for computing switching probability at an output of a logic circuit having multiple inputs and a predetermined function, the method comprising the steps of providing signal and switching probabilities at the inputs, creating a switching table having multiple entries each of which represents a transition status of a signal at the output of the circuit operating in accordance with the predetermined function, computing event probabilities with respect to each of the entries, wherein the event probabilities include a first event probability representing a probability of event that a signal at an input of the circuit switches, a second event probability representing a probability of event that a signal at an input of the circuit does not switch and is at a first value, and a third event probability representing a probability of event that a signal at an input of the circuit does not switch and is at a second value, and accumulating the event probabilities computed with respect to the plurality of entries to produce the switching probability at the output of the circuit.

The computation of event probabilities is preferably performed with respect to entries each representing that there is a transition in a signal at the output of the circuit, or with respect to entries each representing that there is no transition in a signal at the output of the circuit and subtracting from one (1) a value obtained by accumulating the event probabilities.

When the switching table includes input signal values represented with binary bits each of which is determined by values of the inputs and switching values represented with binary bits each of which is determined by switching status of each of the inputs, wherein each of the plurality of entries is determined by corresponding input signal value and switching value, the first event probability may be computed by setting each of the binary bits of a switching value to a predetermined logic value depending on switching status of a corresponding one of the plurality of inputs, detecting binary bits each having a predetermined logic value representing a switching at a corresponding one of the plurality of inputs, assigning an event probability of occurrence of the switching with respect to each of the binary bits detected, and multiplying event probabilities each of which is assigned to a corresponding one of the binary bits detected, whereby producing the first event probability. The second event probability may be computed by detecting binary bits each having a predetermined logic value representing that a signal at a corresponding one of the plurality inputs does not switch, detecting binary bits each having a logic high, assigning an event probability to each of the binary bits detected, the event probability representing a probability of event that a signal at an input corresponding to each of the binary bits detected does not switch and is at the logic high, and multiplying event probabilities each of which is assigned to a corresponding one of the binary bits detected, whereby producing the second event probability. The third event probability may be computed by detecting binary bits each having a logic low, assigning an event probability to each of the binary bits detected, the event probability representing a probability of event that a signal at an input corresponding to each of the binary bits detected does not switch and is at the logic low, and multiplying event probabilities each of which is assigned to a corresponding one of the binary bits detected, whereby producing the third event probability.

The creation of the switching table includes steps of selecting one of the entries, computing a pre-switching output value of the selected entry, which is determined by the predetermined function and one of the input signal values corresponding to the selected entry, switching the one of the input signal values in accordance with one of the switching values corresponding to the selected entry to produce a switched input signal value, computing a post-switch value of the selected entry which is determined by the predetermined function and the switched input signal value, comparing the pre-switch value with the post-switch value, and assigning a first predetermined value to the selected entry when the pre-switch value and the post-switch value are equal to each other, and a second predetermined value to the selected entry when the pre-switch value and the post-switch value are different from each other.

The switching of the input signal value preferably includes steps of representing the input signal value and the switching value with binary bits, and changing a binary bit of the input signal value to an inverse of the binary bit when a corresponding binary bit of the switch value indicates a switching.

The pre-switch value may be computed by providing the binary bits of the input signal value to the inputs of the circuit, wherein each of the binary bits of the input signal value is input to a corresponding one of the inputs, processing the binary bits received by the inputs in accordance with the predetermined function, and generating the pre-switch value as a result of the processing where the pre-switch value has binary bits. The post-switch value may be computed by providing binary bits of the switched input signal value to the inputs of the circuit, each of the binary bits of the switched input signal value being input to a corresponding one of the inputs, processing the binary bits of the switched input signal value received by the inputs in accordance with the predetermined function, and generating the post-switch value as a result of the processing, the post-switch value having binary bits.

The present invention also provides a method of computing a signal probability at the output of the circuit. The method includes steps of creating a truth table for the circuit in accordance with the predetermined function, the truth table having entries respectively corresponding to signals at the inputs, choosing in sequence one of entries each of which has a predetermined value representing that a signal at the output of the circuit switches, determining whether a signal at one of the inputs corresponding to the entry chosen is at logic high, assigning to the signal at the one of the inputs an event probability representing that the signal is at logic high, when the signal is determined to be at logic high, and accumulating event probabilities assigned to signals at inputs corresponding to entries chosen, respectively, whereby producing the signal probability at the output of the circuit. The above-described methods for computing switching probability and signal probability may be applied to a network having multiple logic circuits, wherein signal and switching probabilities at output of a logic circuit are provided to an input of another logic circuit connected to the logic circuit.

The present invention also provides a method for estimating power consumed in a network. The method preferably includes step of providing characteristics of each of the logic circuits, computing the signal and switching probabilities at output of each of the logic circuits, estimating a component power for each of the logic circuits with the characteristics provided and the signal and switching probabilities computed, and accumulating component powers estimated for the logic circuits, respectively, to produce the power consumed in the network. The method for estimating power may further include a step of estimating signal and switching probabilities at inputs of a logic circuit from signal and switching probabilities computed at a precedent stage, when the logic circuit receives no signal and switching probabilities from another logic circuit.

The present invention also provides a method for optimizing power consumed in the network. The method for optimizing power includes steps of estimating a pre-transform power for the network using the step of estimating power, performing synthesis transform with respect to each of the logic circuits in the network, estimating a post-transform power for the network using the step of estimating the power, upon the synthesis transform being performed, and accepting the synthesis transform based on values of the pre-transform power and the post-transform power estimated. The pre-transform power may be updated with the post-transform power until a stopping criterion is reached, whereby producing an optimized power for the network.

These and other objects, features and advantages of the present invention will become apparent from the following detailed description of the preferred embodiments thereof, which is to be read in conjunction with the accompanying drawings, wherein like elements are designated by identical reference numbers throughout the several views.

BRIEF DESCRIPTION OF THE DRAWINGS

This disclosure will present in detail the following description of preferred embodiment with reference to the following figures wherein:

FIG. 4 illustrates logic gates and formulas for propagation of signal and switching probabilities thereof, such formulas being obtained by a method of propagating signal and switching probabilities according to the present invention;

DESCRIPTION OF PREFERRED EMBODIMENTS

Figure 1:
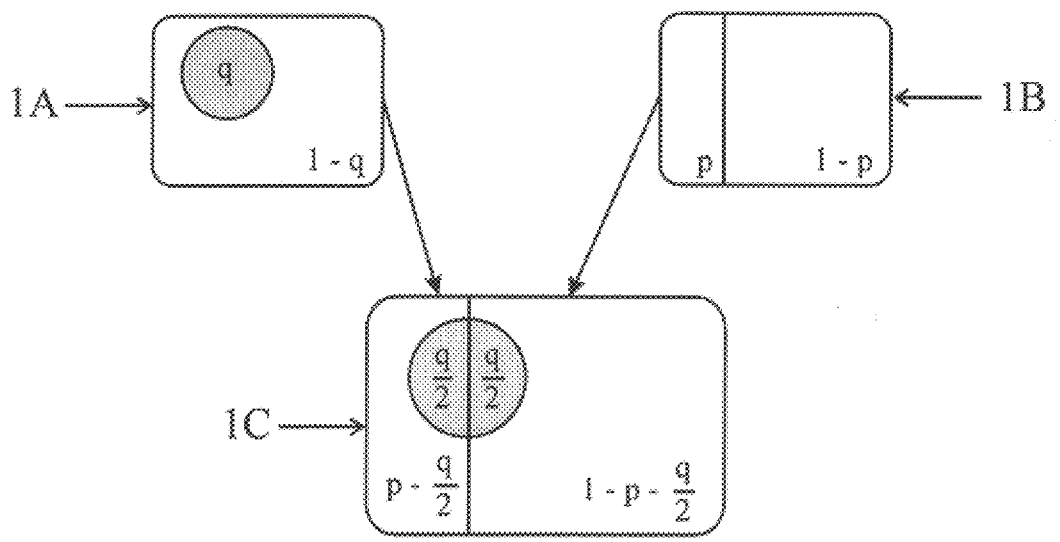
FIG. 1 is a Venn diagram illustrating the relationship between signal and switching probabilities of a logic signal.

Detailed illustrative embodiments of the present invention are disclosed herein. However, specific structural and functional details disclosed herein are merely representative for purposes of describing preferred embodiments of the present invention.

The present invention provides a method for computing signal and switching probabilities at output of a combinatorial logic circuit given signal statistics at inputs of the circuit. The method according to the present invention facilitates it to make an abstraction of switching activities of a logic circuit, to propagate switching activity information through the logic circuit, estimate various quality measures pertaining to power, testability and reliability, and to optimize design of the logic circuit for the estimated quality measures.

When a combinatorial logic circuit (e.g., Boolean function network) includes multiple logic circuits (e.g., logic operators) each of which has its own Boolean function, propagation of signal and switching probabilities through the combinatorial logic circuit can be performed from inputs of the combinatorial logic circuit through all the logic circuits (e.g., logic operators). Since a Boolean function of the combinatorial logic circuit is determined by all the Boolean functions of the logic operators, the combinatorial logic circuit has a complex Boolean function. The logic operators are, for example, simple gates, such as AND, OR and XOR gates, and other frequently occurring Boolean patterns, such as FULL-ADDER and 2-to-1 MUX.

The method according to the present invention provides closed form formulas to propagate signal and switching probabilities through logic operators in a combinatorial logic circuit. In order to propagate signal and switching probabilities through a combinatorial logic circuit, it is necessary to propagate signal and switching probabilities with respect to each of the logic operators in the combinatorial logic circuit. The present invention provides a method for propagating signal and switching probabilities into each logic operator using closed form formulas, so that propagation of signal and switching probabilities is performed through the combinatorial logic circuit. Power consumed in each logic operator can also be estimated with the closed form formulas so as to make it possible to estimate power consumed in the combinatorial logic circuit.

The method according the present invention can handle simultaneous switching of signals at inputs of a combinatorial logic circuit. In other words, assuming that input signals of a combinatorial logic circuit have spatial independence (i.e., input signals are independent of one anther), propagation of signal and switching probabilities into the combinatorial logic circuit can be performed from the input signals switching simultaneously.

In a combinatorial logic circuit for implementing combinational logic operations, each logic operator in the combinatorial logic circuit is associated with a Boolean function.

As a result, the combinatorial logic circuit has a complex Boolean function and becomes a Boolean network. When a Boolean network includes multiple logic operators, a Boolean function of a logic operator is used as an input variable for a Boolean function of a logic operator in the next stage in the Boolean network. For example, when there is an edge from an output Node s of a logic operator to an input Node t of another logic operator in the next stage, a Boolean function ($f_t$) associated with the Node t uses a Boolean function ($f_s$) associated with the Node s as an input variable. If the Node t is one of "fanin" (i.e., a set of input nodes) of the logic operator, the Boolean function ($f_t$) associated with the Node t is contributed in determining a Boolean function of the logic operator. Thus, the Boolean function ($f_s$) associated with the Node s is used as an input variable for determining the Boolean function of the logic operator.

A detailed description of method for propagating signal and switching probabilities into a logic circuit follows referring to pertinent drawings and tables.

Signal probability ($p_i$) of a node (i) of a logic circuit is the probability that a signal at the node (i) is at logic "1". Thus, "$1-p_i$" is the probability that a signal at the node (i) is at logic "0". Similarly, switching probability ($q_i$) of a signal at the node (i) represents the probability that a transition from logic "0" to "1" or from logic "1" to "0" occurs on the signal at the node (i) during a clock cycle. Thus, the signal and switching probabilities ($p_i$, $q_i$) of a signal at the node (i) are defined as follows:

$$0 \leq p_i \leq 1 \quad (2)$$

$$0 \leq q_i \leq 1 \quad (3)$$

When a logic circuit has multiple input nodes ($x_1, x_2, \ldots, x_n$) and an output node (y), signal probability ($p_y$) at the output node (y) of the logic circuit is defined as follows:

$$p_y = s_f(p_{x1}, q_{x1}, p_{x2}, q_{x2}, \ldots, p_{xn}, q_{xn}) \quad (4)$$

where, "$p_y$" is signal probability at the output node (y), "$s_f$" is a signal probability function for a Boolean function associated with the output node (y), "$p_{x1}, \ldots, p_{xn}$" are signal probabilities at the respective input nodes ($x_1, x_2, \ldots, x_n$), and "$q_{x1}, \ldots, q_{xn}$" are switching probabilities at the respective input nodes ($x_1, x_2, \ldots, x_n$).

Similarly, switching probability at the output node (y) of the logic circuit is defined as follows:

$$q_y = sw_f(p_{x1}, q_{x1}, p_{x2}, q_{x2}, \ldots, p_{xn}, q_{xn}) \quad (5)$$

where, "$q_y$" is switching probability at the output node (y), "$sw_f$" is a switching probability function for a Boolean function at the output node (y), "$p_{x1}, \ldots, p_{xn}$" and "$q_{x1}, \ldots, q_{xn}$" are signal probabilities and switching probabilities at the inputs ($x_1, x_2, \ldots, x_n$), respectively.

At a node in a logic circuit, a Boolean function at the node is associated with a signal probability function ($s_f$) and a switching probability function ($sw_f$) of the node. When a logic circuit with multiple input nodes ($x_1, x_2, \ldots, x_n$) has a Boolean function $f(x_1, x_2, \ldots, x_n)$, a signal probability function ($s_f$) for the Boolean function $f(x_{x1}, x_2, \ldots, x_n)$ may be defined as one expressing output signal probability of the logic circuit as a function of input signal and switching probabilities ($p_{x1}, \ldots, p_{xn}$ and $q_{x1}, \ldots, q_{xn}$). Also, a switching probability function ($sw_f$) for the Boolean function $f(x_1, x_2, \ldots, x_n)$ may be defined as one expressing output switching probability of the logic circuit as a function of input signal and switching probabilities ($p_{x1}, \ldots, p_{xn}$ and $q_{x1}, \ldots, q_{xn}$).

In a Boolean network (i.e., a combinatorial logic circuit) having multiple logic circuits, given signal and switching probabilities at inputs of the Boolean network, signal and switching probabilities at output of the Boolean network can be computed using signal and switching probability functions ($s_f$, $sw_f$) of each logic circuit. In such a Boolean network, signal and switching probabilities computed at an output node of a logic circuit will serve as signal and switching probabilities input to an input node of a logic circuit in the next stage. Propagation of signal and switching probabilities through the Boolean network can be performed in a mechanical fashion if signal and switching probability functions of the logic circuits are known. It needs to determine signal and switching probability functions of a logic circuit prior to computing signal and switching probabilities of the logic circuit. Signal probability function ($s_f$) and switching probability function ($sw_f$) at output of a logic circuit can be determined provided that there are given a Boolean function $f(i_1, i_2, \ldots i_n)$ of the logic circuit with "n" inputs ($i_1, i_2, \ldots i_n$) and signal probabilities ($p_{i_1}, p_{i_2}, \ldots p_{i_n}$) and switching probabilities ($q_{i_1}, q_{i_2}, \ldots q_{i_n}$) of the "n" inputs ($i_1, i_2, \ldots i_n$).

Assuming that signal and switching probabilities at inputs of a logic circuit are given and signals at the inputs are independent of one another, signal and switching probabilities at output of the logic circuit are computed as follows.

According to the definitions of signal and switching probabilities as described above, signal and switching probabilities of a signal α associated with certain events can be defined as in Table 1 below.

TABLE 1

| SYMBOL | EVENTS | PROBABILITY |
|---|---|---|
| $a_1$ | signal a is high (logic "1") | $p_a$ |
| $a_0$ | signal a is low (logic "0") | $1-p_a$ |
| a | signal a makes a transition | $q_a$ |
| a | signal a does not make a transition | $1-q_a$ |

Relationship between the events in Table 1 is demonstrated by a Venn diagram in FIG. 1. Diagram A1 in FIG. 1 represents the events that signal α makes transition (q) or does not make a transition (1–q). Diagram B1 represents the events that signal α is logic "1" (p) or logic 0 (1–p). Events obtained by combining the events of Diagrams A and B are shown in Diagram C1. An important observation from Diagram C1 is that signal α makes half of its transitions when signal α is at logic "0" and the other half of its transitions when signal α is at logic "1". Hence, the event representing an occurrence of a transition (q) on signal α is equally divided into two half probabilities (q/2, q/2) by the event that signal α takes on logic "0" or "1". From Diagram C1 in FIG. 1, probabilities of compound events can be determined as shown in Table 2 below.

TABLE 2

| SYMBOL | COMPOUND EVENTS | PROBABILITY |
|---|---|---|
| $a_1$! | signal a is high and makes a transaction | $q_a/2$ |
| $a_1$⋯ | signal a is high and does not make a transaction | $p_a-(q_a/2)$ |
| $a_0$! | signal a is low and makes a transition | $q_a/2$ |
| $a_0$⋯ | signal a is low and does not make a transition | $1-p_a-(q_a/2)$ |

The compound events and their probabilities are essential components in the probability propagation algorithms described in detail below.

In a vector signal $V=\{v_1, v_2, \ldots v_n\}$, where "$v_i$" represents a value (logic "0" or "1") of a signal at time i (i.e., signal i), if the number of elements in the vector signal V that take logic "1" is "m", the number of elements in the vector signal V that take logic "0" is "n−m". For a signal i, signal and switching probabilities $p_i$, $q_i$ can be computed as follows. By definition, signal probability ($p_i$) of the signal i can be defined as Equations (7)–(9) below.

$$p_i = \lim_{n \to \infty}\left(\frac{m}{n}\right) \quad (7)$$

if $p_i \leq \frac{1}{2}$, then $m \leq (n-m)$ (8)

if $p_i \geq \frac{1}{2}$, then $m \geq (n-m)$ (9)

First, under Equation (8), if switching probability ($p_i$) of the signal i is less than or equal to "½", the number of elements taking on logic "1" is less than or equal to the number of elements taking logic "0". The number of transitions from logic "0" to logic "1" is equal to the number of transitions from logic "1" to logic "0" which is at most "m". Thus, the maximum number of transitions possible is "2m". As a result, switching probability ($q_i$) of the signal i on condition of Equation (8) can be defined as Equation (10) below.

$$q_i \leq \frac{2m}{n} = 2p_i \leq 2(1-p_i) \quad (10)$$

On the other hand, under Equation (9), if switching probability ($p_i$) of the signal i is larger than or equal to "½", then the number of elements taking logic "0" is less than or equal to the number of elements taking logic "1". Also, the number of transitions from logic "1" to logic "0" is equal to the number of transitions from logic "0" to logic "1" which is at most "n−m". Thus, the maximum number of signal transitions possible is "2(n−m)". As a result, switching probability ($q_i$) of the signal i on condition of Equation (9) can be defined as Equation (11) below.

$$q_i \leq \frac{2(n-m)}{n} = 2(1-p_i) \leq 2p_i \quad (11)$$

Therefore, switching probability ($q_i$) of the signal i can be defined as Equation (12) below.

$$0 \leq q_i \leq \min\{2p_i, 2(1-p_i)\} \quad (12)$$

If the signal i is temporally independent, then $q_i=2p_i(1-p_i)$. In other words, probability of switching from logic "1" to "0" is "$p(1-p_i)$", and probability of switching from logic "0" to "1" is "$(1-p_i)p_i$". Thus, switching probability (from logic "0" to "1" or from logic "1" to "0") of the signal i is "$2p_i(1-p_i)$".

Given signal and switching probabilities at inputs of a logic circuit, switching probability at output of the logic circuit can be computed using the probabilities in Table 2. As mentioned above, logic circuits into which signal and switching probabilities at inputs are propagated may be various types of logic gates. As an exemplary embodiment, computation of signal and switching probabilities at output of a logic circuit will be described with respect to an AND gate. It should be noted that the method of computing signal and switching probabilities according to the present invention can be applied to any types of logic circuits.

Figure 2:
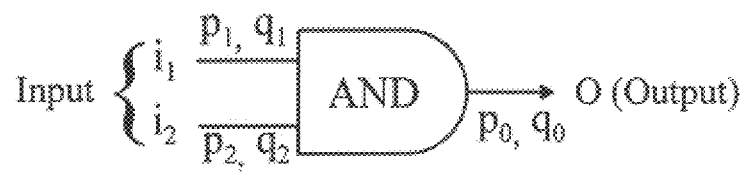
FIG. 2 illustrates a logic AND gate as an exemplary logic circuit into which propagation of signal and switching probabilities is performed.

Referring to FIG. 2, there is provided an AND gate having two inputs ($i_1$, $i_2$) and an output (o). The first input ($i_1$) has first signal and switching probabilities ($p_1$, $q_1$), and the second input ($i_2$) has second signal and switching probabilities ($p_2$, $q_2$). Assuming that the first and second signal and switching probabilities ($p_1$, $q_1$, $P_2$, $q_2$) are known, signal and switching probabilities ($p_o$, $q_o$) at the output (o) are computed as follows.

First, a truth table can be formed with respect to the AND gate as Table 3 below.

TABLE 3

| | | SIGNAL VALUES | |
|---|---|---|---|
| | | $i_1$ | |
| | $i_2$ | 0 | 1 |
| SWITCH-ING | 0 | 0 | 0 |
| | 1 | 0 | 1 |

Using Bayesian theory in association with the entries in the truth table (Table 3), the signal probability ($p_o$) at the output (o) can be computed by multiplying the signal probability ($p_1$) at the first input ($i_1$) and the signal probability ($p_2$) at the second input ($i_2$).

$$p_o = p_1 \times p_2 \quad (13)$$

The signal probability ($p_o$) at the output is essential for computing switching probability ($q_o$) at the output of the AND gate. To compute the switching probability ($q_o$), a "switching table" can be created as Table 4 below.

TABLE 4

| | | SIGNAL VALUES | | | |
|---|---|---|---|---|---|
| | | $i_1 i_2$ | | | |
| | $i_1 i_2$ | 0 | 1 | 11 | 10 |
| SWITCH-ING | 0 | 0 | 0 | 0 | 0 |
| | 1 | 0 | 0 | 1 | 1 |
| | 11 | 1 | 0 | 1 | 0 |
| | 10 | 0 | 1 | 1 | 0 |

In Table 4, the rows are labeled with every possible combination of signal values at the inputs ($i_1$, $i_2$) of the AND gate, and the columns are labeled with every possible switchings at the inputs ($i_1$, $i_2$). For a general application, when a logic circuit has "n" inputs each of which can take "m" kinds of values, a switching table for the logic circuit will be "$m^n \times m^n$" table. Thus, inputs of the logic circuit each have logic "0" or logic "1", size of switching table for the logic circuit is "$2^n \times 2^n = 2^{2n}$". Since the AND gate in FIG. 2 has two inputs ($i_1$, $i_2$), the switching table (Table 4) for the AND gate is "4×4" table.

In Table 4, the entries corresponding to the situations causing a transition at the output (o) of the AND gate are "1", and the other entries corresponding to the situations causing no transition at the output (o) are "0". For example, if the input signals ($i_1, i_2$) have value "10" and the first input signal ($i_1$) does not have a transition and the second input signal ($i_2$) has a transition, the entry corresponding to the input signals ($i_1, i_2$) is marked as "1" in Table 4 because there is a transition at the output (o) of the AND gate. That is, the entry is "1" in the box corresponding to column "01" and row "10". In like manner, "4×4" entries in Table 4 can be determined.

Algorithm for creating a switching table for a logic circuit having "n" inputs which can take "2" kinds of values (e.g., logic "0" or "1") is described below.

```
BEGIN
1.   Set n=number of inputs of logic function (f).
2.   Set l=0; b=2ⁿ;                                    //begin step 3B in FIG. 3.
3.   Allocate swt = b × b table.
4.   for (l=0; l<b; l=l + 1) do {                      //begin step 3C in FIG. 3.
5.       j = l;
6.       for (k = 0; k < b; k = k + 1) do {            //begin step 3G in FIG. 3.
7.           Let j₁, j₂, . . . , jₙ and k₁, k₂, . . . , kₙ be the bits in the binary
8.           representation of l and k, respectively
9.           pre-switch = f(j₁, j₂, . . . jₙ);         //begin step 3J in FIG. 3.
10.              for (i = 0; i < n; i = i + 1) {       //begin step 3K in FIG. 3.
11.                  if (kᵢ == 1)
12.                      jᵢ = j̄ᵢ;                      //j̄ᵢ is the inverse of jᵢ
13.              }
14.          post-switch = f(j₁, j₂, . . . jₙ);        //begin step 3L in FIG. 3.
15.          if (preswitch = postswitch) then          //begin step 3M in FIG. 3.
16.              swt[j,k] = 0;
17.          else
18.              swt[j,k] = 1;
19.       }
20.  }
21.  return swt;_____//step 3D in FIG. 3.
22.  stop;                                             //step 3E in FIG. 3.
END
```

Figure 3:
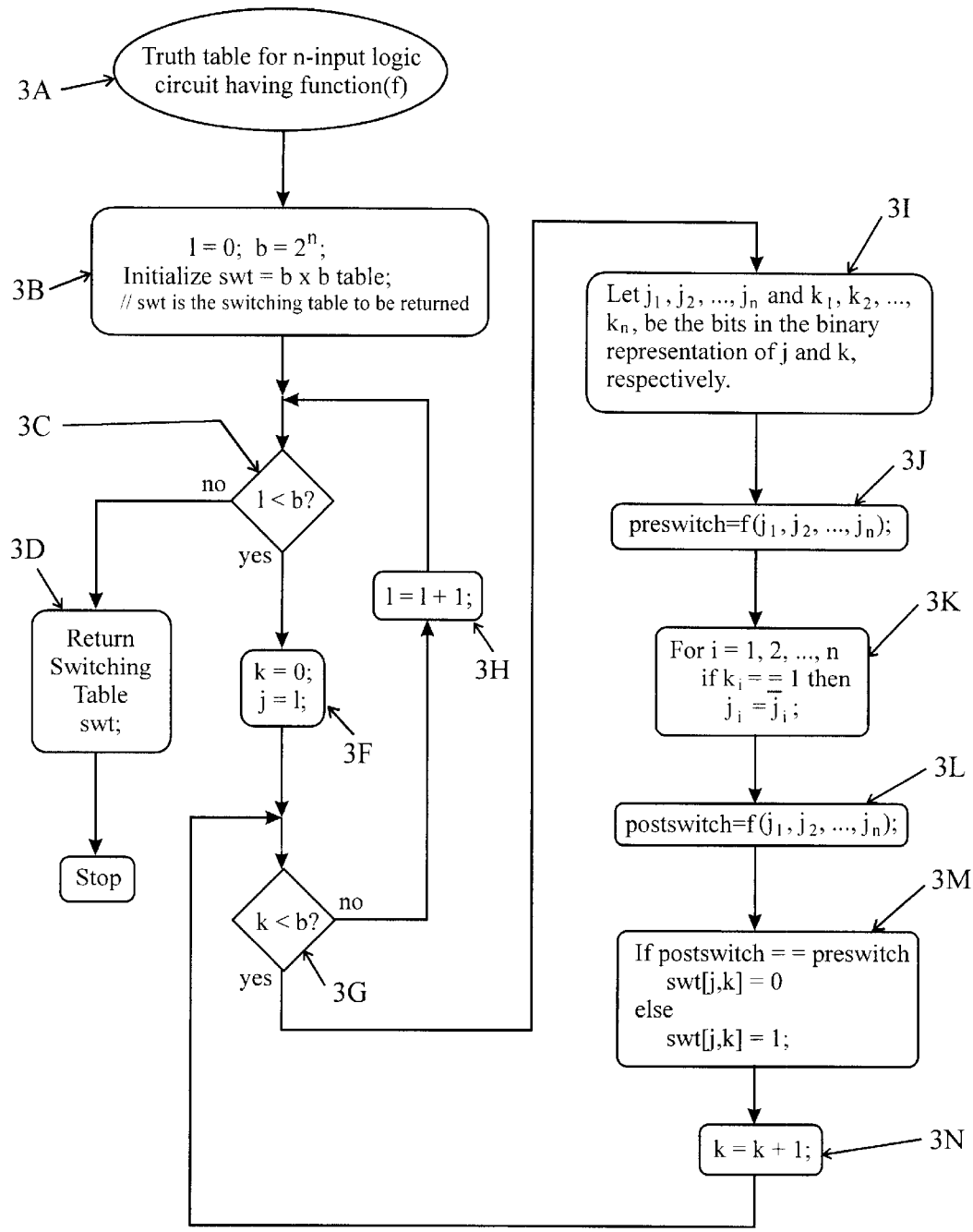
FIG. 3 is a flow chart describing a method of creating switching table according to the present invention.

Referring to FIG. 3, there is provided a flow chart for describing a method of creating a switching table for a logic circuit to which the above algorithm applies. First, a truth table for n-input logic circuit is created (step 3A). For example, if the logic circuit is the AND gate in FIG. 2, truth table can be created as shown in Table 3. Assuming that the logic circuit has "n" inputs and each of the inputs has logic "0" or "1", the size of a switching table for the logic circuit will be "$2^n \times 2^n$" and thus the switching table can be initialized to a "$2^n \times 2^n$" table (step 3B). Also, in step 3B, a loop counter l is set to "0".

The loop counter l counts from "0" to "$2^n-1$", which is the number of columns or rows in the switching table. For the purpose of convenience in describing the embodiments of the invention, it is assumed that the loop counter l counts the number of columns of the table from "0" to "$2^n-1$".

Upon completing the initialization process in step 3B, it is determined whether the loop counter l is less than "$2^n$" (step 3C). Here, a parameter b is set to "$2^n$". If the loop counter l is less than the parameter b, another loop counter k is set to "0" and a parameter j is set to the same value as the counter l (step 3F). The counter k counts from "0" to "$2^n-1$" which is the number of columns or rows in the switching table. For the purpose of convenience in describing the embodiments of the invention, it is assumed that the loop counter k counts the number of rows of the table from "0" to "$2^n-1$". Then, a value of the counter k is equal to a value representing switchings of the inputs in the switching table (this will be described in detail in the following steps).

Next, it is determined whether the loop counter k is less than the parameter b (=$2^n$) (step 3G). If the counter k is equal to or more than the parameter b, the value of the counter l is increased by "1" and then the increased value of the counter l is compared with the parameter b in step 3C. Thus, the iterative loop formed of steps 3C through 3H is performed by counting the loop counter l from "0" to "$2^n-1$".

If the counter k is less than the parameter b in step 3G, a process to detect a transition at output of the circuit is performed with respect to certain inputs with certain switching data. Assuming that the switching table swt initialized in step 3B has the same format as that in Table 4, the parameter j (or the counter l) represents a signal value at inputs of the circuit, and the counter k represents switching data corresponding to the signal value. It should be noted that such a designation of the parameters j and the counter k is only for the purpose of describing the preferred embodiments of the invention, and that the parameter j and the counter k may be set to represent switching data and a signal value, respectively.

Values of the parameter j and the counter k can be represented with binary bits, such as "$j_1 j_2 \ldots j_n$" and "$k_1 k_2 \ldots k_n$", respectively (step 3I). Since the circuit has "n" inputs, a value of the n-input (i.e., a signal value or the parameter j) can be represented with "n" bits, such as $j_1, j_2, \ldots, j_n$. Also, the switching data (i.e., the counter k) can be represented with "n" bits, such as $k_1, k_2, \ldots, k_n$. Given the value of the n-input ($j_1, j_2, \ldots, j_n$), an output value of the circuit can be obtained which is a variable of function (f) of the circuit. At this stage, no switching has occurred in the inputs so that the output value is denoted as "preswitch", of which value varies depending on the function (f) with the n-input ($j_1, j_2, \ldots, j_n$) (step 3J).

After obtaining the preswitch value in step 3J, a switching is performed with respect to each of the n-input ($j_1, j_2, \ldots, j_n$) in accordance with the switching data (step 3K). This switching process is iteratively performed with respect to each bit of the binary representation($j_1 j_2 \ldots j_n$) of the parameter j. In other words, with respect each bit of the parameter j from the first bit ($j_1$) to the last bit ($j_n$), it is determined whether a corresponding bit ($k_i$) of the switching data (k) is, for example, at value "1" which represents an occurrence of switching at the corresponding bit ($j_i$) of the input signal value (j) (step 3K). If the corresponding bit ($k_i$) is at value "1", the value of "$j_i$" is changed to the inverse value thereof, for example, from "0" to "1" or from "1" to "0". If the corresponding bit ($k_i$) is not at value "1", the value of "$j_i$" is not changed (i.e., no switching occurs). Upon completing with respect to the bit $j_i$, such a switching process is performed with respect to the next bit $j_{i+1}$ of the input signal value in accordance with the next bit $k_{i+1}$ of the switching data (step 3K).

By performing the switching process with respect to the "n" bits ($j_1, j_2, \ldots, j_n$) of the signal value (j) in accordance with the "n" bits of the switching data (k), new n-bit input signal value $(j_1', j_2', \ldots, j_n')$ is obtained to be input to the circuit with the function (f). When the output value of the circuit after the switching process is denoted as "postswitch", value of the postswitch varies depending on the function (f) with the switched "n" inputs $(j_1', j_2', \ldots, j_n')$ (step 3L). In other words, the value of postswitch is determined by the new n-bit input signal value $(j_1', j_2', \ldots, j_n')$ obtained through the switching process, while the value of preswitch is determined by the n-bit input signal value $(j_1, j_2, \ldots, j_n)$ before the switching process.

Upon obtaining the postswitch, it is determined whether the values of the postswitch and the preswitch are equal to each other (step 3M). In this step, it is determined whether a transition has occurred at the output of the circuit. A transition at the output is a change of the output signal, for example, from logic "0" to logic "1" or from logic "1" to logic "0". If the value of the postswitch is equal to that of the preswitch, an entry (swt [j, k]) in the switching table which corresponds to the input signal value j and the switching data k, is set, for example, to "0". On the other hand, if the values of the preswitch and postswitch are different from each other, the entry (swt [j, k]) is set to "1". In other words, if a transition has occurred at the output of the circuit, the entry (swt [j, k]) is set to "1", while the entry (swt [j, k]) is set to "0" if no transition has occurred at the output of the circuit.

Upon determining the value of the entry (swt [j, k]) in the switching table, the counter k is increased by "1" (step 3N). By increasing the counter k, the next switching data in the switching table is applied to the input signal value j. The increased counter k is then compared with the parameter b ($=2^n$) to determine whether the increased counter k is less than the parameter b (step 3G). Thus, an iterative loop formed of steps from 3G to 3N is performed by counting the counter k from "0" to "$2^n-1$".

When the counter k is not less than the parameter b in step 3G and the counter l is also not less than the parameter b in step 3C, the switching table is deemed to be completed and returned (step 3D). The switching table for the circuit created through such a process is used to compute signal and switching probabilities at output of the circuit provided that signal and switching probabilities at inputs of the circuit are given.

Referring again to FIG. 2, assuming that the input signals $(i_1, i_2)$ are spatially independent of one another, the switching probability $(q_o)$ at the output of the AND gate can be computed from the switching table (Table 4). For entries of value "1" in the switching table, switching probability for each entry is computed and then switching probabilities for all the entries of value "1" are summed. For example, switching probability for the value "1" entry corresponding to column "01" and row "10" can be computed as follows:

$$P(i_{1_{1\leftrightarrows}}) \times P(i_{2_{0\updownarrow}}) = \left(p_1 - \frac{q_1}{2}\right) \times \frac{q_2}{2} \quad (14)$$

where, referring to Table 2, "$P(i_{1_\leftrightarrows})$" represents the event probability (P) that the first input signal $(i_1)$ is high and does not make a transition, and "$P(i_{2_{0\uparrow}})$" represents the event probability (P) that the second input signal $(i_2)$ is low and makes a transition. With respect to all the entries of value "1" in the switching table (Table 4), event probabilities of the input signals $(i_1, i_2)$ are obtained from Table 2 in the same manner as Equation (14). Switching probability $(q_0)$ at the output of the AND gate is obtained by summing the products of event probabilities of the two input signals $(i_1, i_2)$ as follows:

$q_0 = p(i_{1_{1\leftrightarrows}})p(i_{2_{1\downarrow}\uparrow}) +$ $p(i_{1_{1\leftrightarrows}})p(i_{2_{0\downarrow}}{}^{s2}) +$ $p(i_{1_0}{}^{s2})p(i_{2_0}{}^{s2}) +$ $p(i_{1_1\uparrow})p(i_{2_1\uparrow}) +$ $p(i_{1_0\uparrow})p(i_{2_{1\leftrightarrows}}) +$ $p(i_{1_1\uparrow})p(i_{2_1\uparrow}) \quad (15)$ In Equation (15), each of the products of the event probabilities can be transformed into an equation of signal and switching probabilities $(p_1, q_1, p_2, q_2)$ using Table 2. As a result of simplifying Equation (15), the switching probability $(q_0)$ at the output of the AND gate is obtained as follows:

$$q_0 = p_1 q_2 + q_1 p_2 - \frac{q_1 q_2}{2} \quad (16)$$

As shown in Equation (16), the switching probability $(q_0)$ at the output of the AND gate can be computed provided that the signal and switching probabilities $(p_1, q_1, p_2, q_2)$ of the inputs $(i_1, i_2)$ are given.

Referring to FIG. 4, there are provided a set of exemplary logic circuits having different logic functions, such as AND, OR, XOR, ADD, and MUX. With respect to each logic circuit having its own logic function, a truth table can be created in a like manner as creating Table 3. From the truth table, a switching table for the logic circuit can be created in a like manner as creating Table 4. Then, signal and switching probabilities at output of each logic circuit can be computed using the truth and switching tables, respectively. For example, when the OR gate has two inputs (a, b) and signal and switching probabilities $(p_a, q_a, p_b, q_b)$ which are known, signal probability at the output of the OR gate can be obtained from the truth table as follows:

$$p_a + p_b - p_a p_b \quad (17)$$

Also, upon creating the switching table for the OR gate, switching probability can be computed as follows:

$$(1-p_a)q_b + (1-p_b)q_a - (q_a q_b)/2 \quad (18)$$

In a like manner, with respect to each of the logic circuits having OR, XOR, ADD, and MUX functions, signal and switching probabilities at the output can be expressed with signal and switching probabilities $(p_a, q_a, p_b, q_b)$ at the inputs which are known. Thus, given values of the input signal and switching probabilities $(p_a, q_a, p_b, q_b)$, values of the output signal and switching probabilities can be computed. Since one skilled in the art can readily create truth and switching tables for the logic circuits in FIG. 4 using the method of creating truth and switching tables for the AND gate as described above, a detailed description regarding the logic circuits other than the AND gate is omitted.

With respect to a logic circuit having a predetermined function (f), upon creating truth and switching tables for the logic circuit, signal and switching probabilities $(p_f, q_f)$ at output of the logic circuit can be obtained in accordance with the following algorithm.

```
BEGIN
1.      Create truth table for function (f) of
        logic circuit with "n" inputs.
2.      Set p_f = 0.0, q_f = 0.0.                          //step 5C in FIG. 5
3.      for each entry marked '1' in the truth table do {  //begin step 5D in FIG. 5
4.          Let {u_1, u_2, ... u_n} be values (0 or 1) of
            the inputs for an entry marked '1'.
5.          Set temp = 0.0;
6.          for each i ∈ {1, 2, ..., n} do {               //begin step 5F in FIG. 5
7.              if (u_i = 1) then
8.                  multiplier = p_i;
9.              else
10.                 multiplier = 1 - p_i;
11.             temp = temp × multiplier;
12.         }
13.         p_f = p_f + temp;                              //step 5G in FIG. 5
14.     }                                                  //obtaining signal probability
15.     Create switching table (swt) for the function (f)
17.     swt = 2^n × 2^n;                                   //step 5H in FIG. 5
18.     Set q_f = 0.0;
19.     for each row r in swt do {                         //begin step 5I in FIG. 5
20.         multiplier = 1.0;
21.         Let v_i in {v_1, v_2, ..., v_n} be '0 or 1' depending
            on whether input i makes a transition.
22.         for each i ∈ {1, 2, ..., n} do {               //begin step 5K in FIG. 5
23.             if (v_i = 1.0) then
24.                 multiplier = multiplier × (q_i/2);
25.         }
26.         if there is i ∈ {1, 2, ..., n} | v_i = 0.0 then {   //begin step 5L in FIG. 5
27.             rowval = 0.0;
28.             for each unprocessed entry in row r do {   //begin step 5M in FIG. 5
29.                 Let {u_i | i=1, 2, ..., n} be 0/1 depending on
                    whether input i is low or high for this entry.
30.                 temp = 1.0;
31.                 for each i ∈ {1, 2, ..., n} do {       //begin step 5N in FIG. 5
32.                     if (u_i = 1) then
33.                         $$temp = temp \times \left(p_i - \frac{q_i}{2}\right);$$
34.                     else
35.                         $$temp = temp \times \left(1 - p_i - \frac{q_i}{2}\right);$$
36.                 }
37.                 rowval = rowval + temp;                //step 5P in FIG. 5
38.                 Mark this entry (e) as processed;
39.             }
40.             q_f = q_f + rowval × multiplier;           //step 5Q in FIG. 5
41.         }
42.         else
43.             q_f = multiplier;                          //step 5R in FIG. 5
44.         // All the inputs have switched.
45.     }
46.     //Computation of switching probability complete.
47.     return p_f, q_f;                                   //step 5J in FIG. 5
48.     stop
END
```

Figure 5:
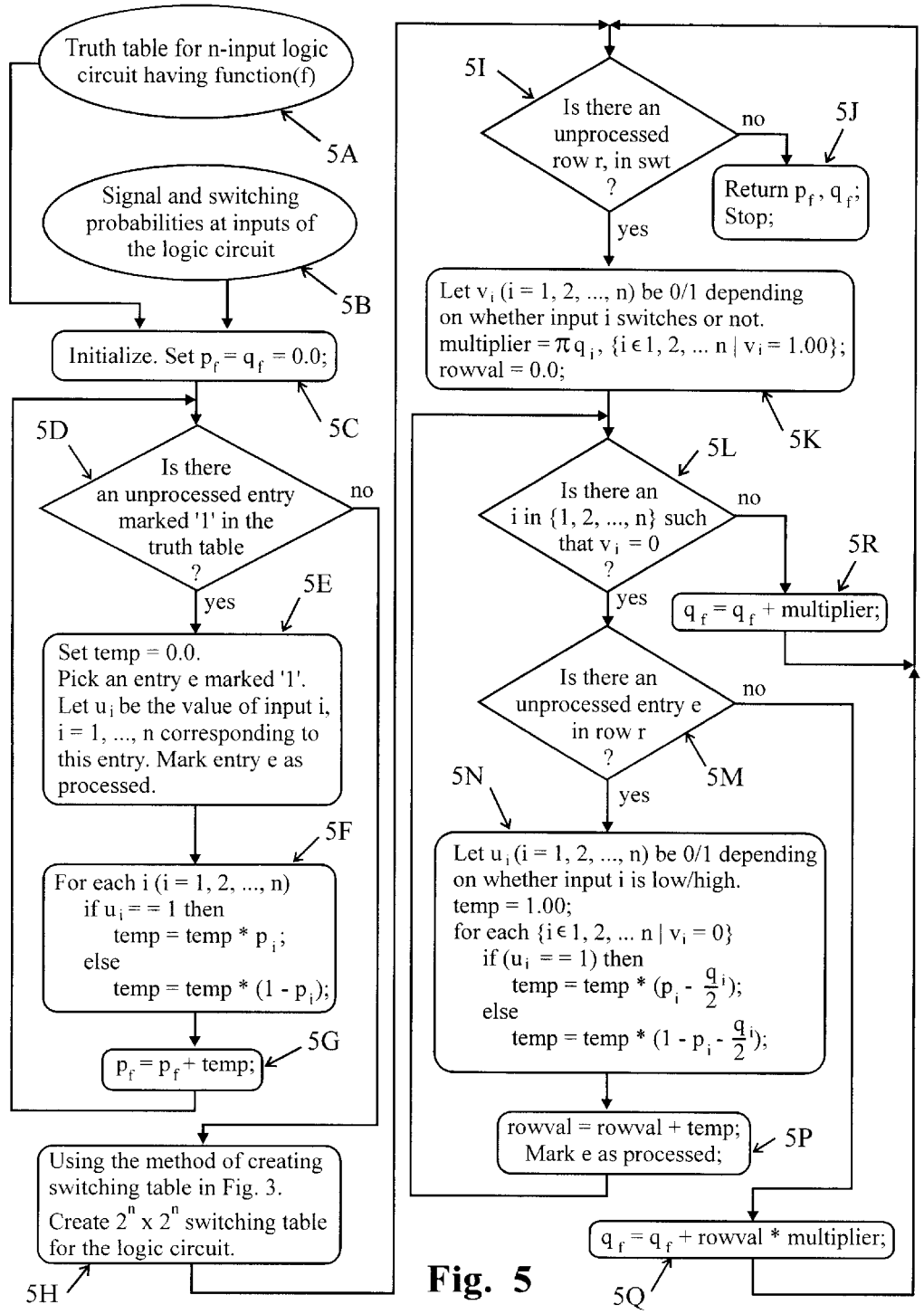
FIG. 5 is a flow chart describing a method of computing signal and switching probabilities at output of a circuit according to the present invention.

In FIG. 5, a flow chart is provided for describing the implementation of the above algorithm in an n-input logic circuit. Given a function (f) and signal and switching probabilities at inputs of the logic circuit, signal and switching probabilities ($p_f$, $q_f$) at output of the logic circuit can be obtained. First, truth table is obtained for the function (f) of the logic circuit (step 5A), and signal and switching probabilities at inputs of the logic circuit are provided (step 5B). The truth table obtained in step 5A is the same as that obtained in step 3A in FIG. 3. In other words, the truth table used for creating the switching table can also be used in propagation of signal and switching probabilities into the circuit. For an initialization of the process, values of signal and switching probabilities ($p_f$, $q_f$) at output of the logic circuit are set to zero (0) (step 5C).

Upon such initialization process, signal probability ($p_f$) at the output of the logic circuit is computed. In the truth table obtain in step 5A, it is determined which entry is marked "1" and whether the entry marked "1" has been processed (step 5D). If there is at least one unprocessed entry marked "1" in the truth table, signal probability for each of the entries marked "1" is computed. Upon choosing one of the entries marked "1" the chosen entry (e) is marked as "processed" so as not to be chosen again in a subsequent process (step 5E). With respect to the chosen entry (e), values of the inputs are obtained from the truth table (step 5E). If the logic circuit has "n" inputs such as input i (i=1, ... n), the values of the inputs can be denoted as "$u_i$ (i=1, ... n)". For each input value $u_i$, it is determined whether the input value $u_i$ is, for example, "1" or "0" (step 5F). In other words, assuming that the inputs of the logic circuit have two kinds of values ("0" or "1"), it is determined whether the input i has value "0" or "1". Under the definition of signal probability $p_i$ (i.e., probability that signal at the input i is at value "1" per unit time), "$p_i$" is assigned for the input i if the input value $u_i$ is "1", and "$1-p_i$" is assigned for the input i if the input value $u_i$ is "0". Such a process to determine and assign probability either "$p_i$" or "$1-p_i$" is sequentially performed with respect to all the input values ($u_1, u_2, \ldots, u_n$) corresponding to the chosen entry (e). The probability ("$p_i$" or "$1-p_i$") assigned for input i (i=1, ... n) corresponding to the chosen entry (e) in step 5F is added to the signal probability ($p_f$) computed in a preceding stage (step 5G). Then, it is again determined whether there is an unprocessed entry marked "1" in the truth table (step 5D). If so, a next entry marked "1" is chosen to be processed in steps 5E through 5G.

An iterative loop formed of steps 5D through 5G is performed until there is no unprocessed entry marked "1" in the truth table. Upon completing the iterative loop process with respect to all the entries marked "1" in the truth table, the signal probability ($p_f$) at the output of the logic circuit can be obtained.

When it is determined that there is no unprocessed entry marked "1" in the truth table (step 5D), a switching table for the n-input logic circuit is created using the method of creating switching table described above referring to FIG. 3 (step 5H). The switching table obtained in step 5H is, for example, a $2^n \times 2^n$ table if the "n" inputs of the logic circuit may have two kinds of values (e.g., 0 or 1). In the $2^n \times 2^n$ entries of the switching table, an entry is marked "1" or "0" depending on whether the output of the logic circuit makes a transition or not, respectively.

Upon creating the switching table in step 5H, certain event probabilities are computed with respect to each row in the switching table. In the switching table (swt), it is first determined whether there is an unprocessed row (r) (step 5I). Assuming that "$v_i$" (i=1, 2, ..., n) represents a switching data of input i in the switching table, value of "$v_i$" is set to "1" or "0" depending on whether the input i switches or not, respectively (step 5K). With respect to the unprocessed row (r) chosen in step 5I, it is determined whether the value of "$v_i$" (i=1, 2, ..., n) is "1", and multiplier corresponding to input i is set to "$q_i/2$" (i=1, 2, ..., n) if the value $v_i$ is "1" (step 5K). The event probability "$q_i/2$" is from Table 2, where probability of the event that signal α makes a transition (regardless of high or low) is "$q_a/2$". Thus, "$q_i/2$" in step 5K represents probability of the event that the input i switches (i.e., $v_i=1$) regardless of its value (high or low).

Upon setting the multiplier to the event probability "$q_i/2$" for each switching input in the unprocessed row r, it is determined whether there is at least an input that does not switch (i.e., $v_i=0$; i=1, 2, ..., n) (step 5L). If there is no input that does not switch, the multiplier obtained in step 5K is added to the value of switching probability obtained in preceding stages (step 5R).

On the other hand, if it is determined that there is at least one input that does not switch in step 5L, probability of the event that the input is high or low is computed. In the row r chosen in step I, it is determined whether there is an unprocessed entry (e) marked "1" (step 5M). If there is an unprocessed entry (e), it is determined whether value of the input corresponding to the entry (e) is "1" (high) or "0" (low) (step 5N). In other words, assuming "$u_i$" represents value of the input i (i=1, 2, ..., n), "$u_i$" is set to "1" or "0" depending on whether the input i is high or low, and then it is determined whether "$u_i$" is "1" or "0". If "$u_i$" is "1", event probability "$p_i-q_i/2$" is assigned to the input i, and if "$u_i$" is "0", event probability "$1-p_i-q_i/2$" is assigned to the input i. The event probabilities are from Table 2, where "$p_a-q_a/2$" represents probability of the event that signal α is high and does not make a transition and "$1-p_a-q_a/2$" represents probability of the event that signal α is low and does not make a transition. The event probability obtained in step 5N is multiplied to a preexisting event probability obtained in preceding stages to produce a new event probability (temp).

Upon obtaining the new event probability (temp) for the entry (e), the new event probability (temp) is added to a preexisting event probability for the row (r) obtained in preceding stages to produce a new event probability (rowval) for the row (r) (step 5P). The entry (e) is then marked "processed". Then, it is repeated in steps 5L and 5M to determine whether there is another input that does not switch and, if so, whether there is an unprocessed entry in the row (r), respectively. If it is determined that there is no unprocessed entry in the row (r), the switching probability ($q_f$) is updated such that the product of the event probability (rowval) for the row (r) obtained in step 5P and the multiplier obtained in step 5K is added a value of switching probability in a preceding stage (step 5Q).

Upon updating the switching probability ($q_f$) in step 5Q or 5R, it is repeated in step 5I to determine whether there is another unprocessed row in the switching table. If it is determined that there is another unprocessed row, the iterative loop process formed of steps 5K through 5P is performed with respect to the new unprocessed row chosen in step 5I. By performing the iterative loop formed of steps 5I through 5R until it is determined that there is no unprocessed row in the switching table, the final value of switching probability at output of the circuit is obtained.

It should be noted that it is readily accomplished by one skilled in the art to modify the embodiment described above referring to FIG. 5 such that the computation of te event probabilities can be performed with respect to each column, instead of each row, in the switching table.

As mentioned above, entries of the switching table for the logic circuit are independent of one another. In other words, assuming that the logic circuit has "n" inputs, each entry in the switching table is corresponding to an simultaneous occurrence of a set of "$2^n$" events. When "$E_i$" represents a simultaneous occurrence of "$2^n$" events for an entry $e_i$ in the switching table, any two simultaneous occurrences $E_i$ and $E_j$ ($i \neq j$) are independent of each other and mutually exclusive. Thus, when the switching table has entries of $2^n \times 2^n$, the possible maximum number of processes for computing the switching probability at the output of the logic circuit would be "$2^{2n}$". This is because the process for computing the switching probability in FIG. 5 would have to be performed "$2^n$" times with respect to $2^n \times 2^n$ entries in the switching table if all the entries are value "1".

In practice, however, the possible maximum number of processes for computing the switching probability is half the number of entries in the switching table. In the above example of $2^n \times 2n$ switching table, if the number of entries marked "1" is greater than "$2^{2(n-1)}$", the number of entries marked "0" must be less than "$2^{2(n-1)}$". In this case, the switching probability can be obtained by computing the probability that the output of the logic circuit does not make a transition and then subtracting the computed probability from "1". Therefore, the possible maximum number of processes for computing switching probability is "$2^{2(n-1)}$" in the $2^n \times 2^n$ switching table.

From now on, application of the propagation of signal and switching probabilities in a circuit will be described. The propagation of signal and switching probabilities according to the present invention may apply to all the tools requiring power estimation and/or power optimization. In other words, tools that use power consumption as an optimization criterion can benefit greatly by using the propagation of signal and switching probabilities of the present invention. One of the exemplary circuits that benefit from the propagation of signal and switching probabilities, is computer aided design (CAD) tools.

It should be noted that variations useful in different circumstances may be readily made in the method (e.g., algorithms) for propagating the signal and switching probabilities, and that the method with such variations can be applied to power estimation and optimization for tools, such as CAD. The method for computing and propagating signal and switching probabilities according to the present invention can be used not only for computing and propagating signal and switching probabilities through circuits in such tools, but also for generating closed form equations for computing signal and switching probabilities for most library elements, such as AND, OR, XOR, NAND, NOR, and XNOR gates, in the circuits. The closed form equations can be evaluated at high speed. This is accomplished by computing a symbolic equation denoting the probability of a simultaneous occurrence for a corresponding entry instead of computing a probability number. Computation of symbolic equation is performed as described in the method of propagating signal and switching probabilities through a Boolean function network, except that the computation is performed symbolically. The result of such a symbolic computation is a simple closed form equation for most common gates. Computation of the signal and switching probabilities at the output of the AND gate is described above as an example of application of the propagation of signal and switching probabilities of the present invention in an element. Once such a closed form equation is determined for a function of an element, the closed form equation can be efficiently used for propagation of signal and switching probabilities of the element.

Referring again to FIG. 4, there are provided closed form formulas for a set of logic circuits (i.e., components of a combinatorial network). Each of the closed form formulas expresses signal or switching probability at output of the corresponding logic circuit. Such closed form formulas in FIG. 4 are reduced to very simple equations which can be evaluated at high speed. Derivation of the closed form formulas, in essence, allows characterization of switching activities in the logic circuits which are common logic gates in a digital network, so that it can be referred to as gate-level switching characterization. It needs to be noted that such characterization is implementation independent and is only dependent on function of each logic circuit. Using such characterization (or closed form formulas) of logic circuits (or components) that form basic blocks in a more complex circuit (e.g., a digital combinatorial network), propagation of signal and switching probabilities through the complex circuit can be more efficiently performed.

In the present invention, the computation of signal and switching probabilities at output of a logic circuit would be best performed if the circuit does not contain any reconvergent paths. This is because it needs to be assumed that signal and switching probabilities at inputs of the circuit are independent of one another. Under such assumption, Bayesian rules of probability can be applied to the computation of signal and switching probabilities at output of the circuit.

Nonetheless, the method for propagating signal and switching probabilities of the present invention serves as a good heuristic to compute signal and switching probabilities at output of circuits containing reconvergent paths. Although the computation of signal and switching probabilities at output of a circuit containing reconvergent paths would be less accurate than that of a circuit not containing reconvergent paths, it shows in practice that the method of the present invention has a high level of accuracy in computation of signal and switching probabilities at output of a circuit containing reconvergent paths. The effect of reconvergent paths can be eliminated by collapsing multi-fanout nodes into their fanout during the propagation process.

Figure 6:
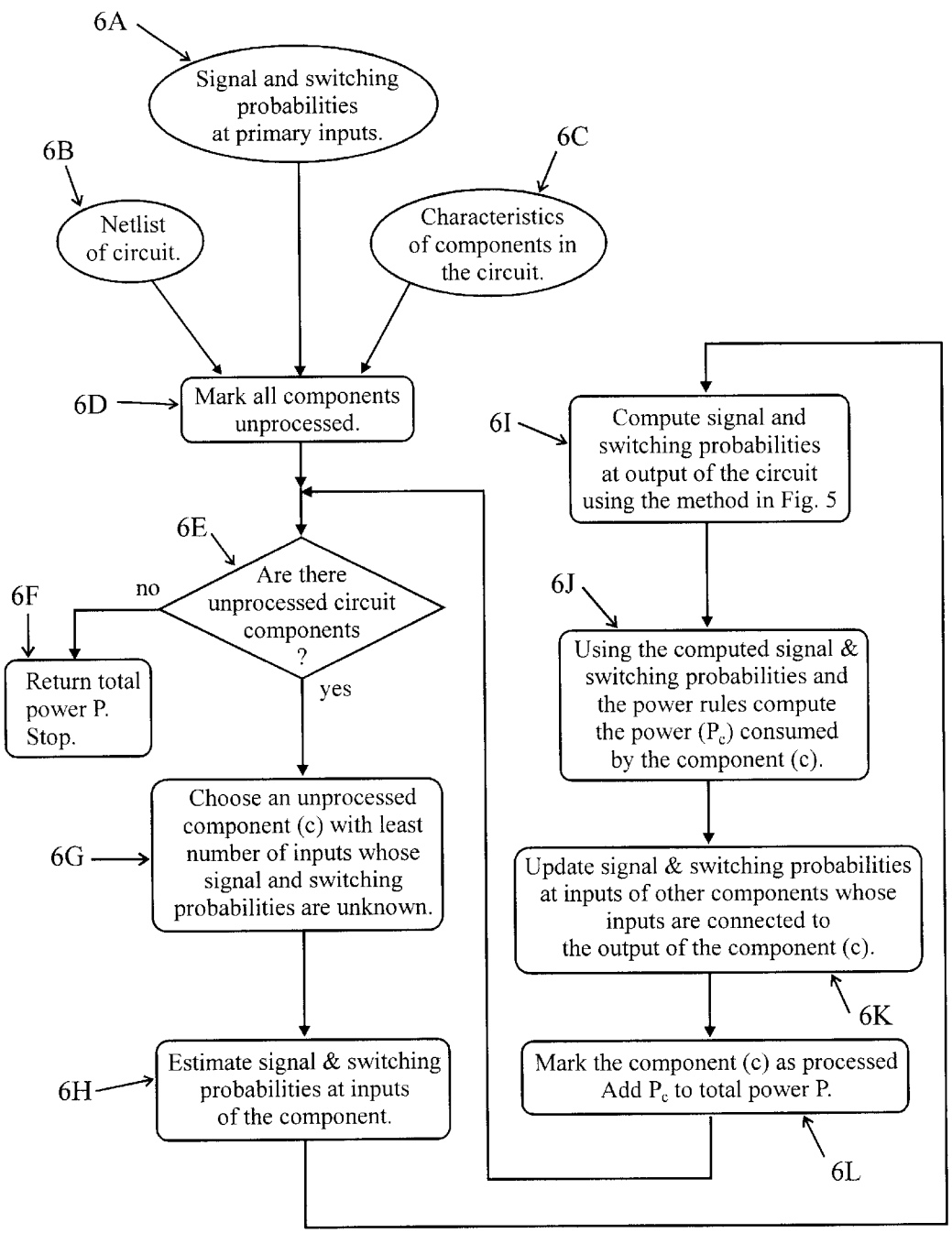
FIG. 6 is a flow chart describing a method of estimating power consumed in a circuit according to the present invention.

Referring to FIG. 6, there is provided a flow chart for describing a method of estimating power consumed in a circuit using the method of propagating signal and switching probabilities into the circuit according to the present invention. In a process of estimating power consumed in a circuit, it is necessary for certain initial inputs to be provided. Such certain initial inputs include signal and switching probabilities at primary inputs the circuit (step 6A), a net list of the circuit (6B), and characteristics, including power rules, of components of the circuit (6C). The primary inputs are input nodes of the circuit which have no incoming edges. The signal and switching probabilities at primary inputs of the circuit can be provided to by a user or computed from test vectors that are supplied by a user for realistic logic simulation of the circuit.

A net list of the circuit would be traversed from the inputs of the circuit by visiting each component of the circuit and computing power consumed on each component. A net defines a set of electrically equivalent inputs and outputs of some blocks in a circuit. These inputs and outputs are all connected to each other by metal wires. The set of all such nets defines all the interconnections in the circuit and is called a net list. A traverse of the net list starts at the primary inputs and visits each block connected to these inputs, then visits each block connected to the outputs of the blocks already visited and so on until all the blocks are visited. For example, a net would connect an output of block 1 to a first input of block 2. A traverse of this net would start at block 1 to determine that the output of block 1 is connected to block 2, then visit block 2. Such a traverse of all the nets in a net list is termed a traverse of the net list.

Also, since components of the circuit can be pre-characterized for power consumed in the circuit based on, for example, design, technology, and signal and switching probabilities of the components, the characteristics of the components can be considered as a part of inputs for a process of power estimation (step 6C).

A process of estimating power consumed in a circuit includes computation of power consumed in each of the components in the circuit, thus it involves propagation of signal and switching probabilities from inputs to an output of the circuit through all the components. In such a propagation of signal and switching probabilities, characteristics of each component are used as an input factor for computation of signal and switching probabilities at output of the component and thus used as an input factor for propagating signal and switching probabilities in a subsequent component in the circuit.

As another initial step of the process of power estimation, all the components are marked "unprocessed" so that all the components are processed until there is no unprocessed component (step 6D). For this, it needs to determine whether there is unprocessed component(s) in the circuit whenever completing an iterative loop following (step 6E). If it is determined that there is no unprocessed component in step 6E, it is deemed to complete the process of power estimation and the estimated power is returned (step 6F).

If it is determined that there is at least one unprocessed component in step 6E, an unprocessed component (c) is chosen to be processed (step 6G). Preferably, the unprocessed component (c) chosen in step 6G is the one with least number of inputs. Signal and switching probabilities at the inputs of the chosen component (c) may be unknown. With respect to the chosen component (c), signal and switching probabilities at inputs of the component (c) may be estimated (or guessed) (step 6H).

With the estimated signal and switching probabilities at inputs of the component (c), signal and switching probabilities at output of the component (c) are computed using the method of computing signal and switching probabilities according the present invention, which is described above referring to FIG. 5 (step 6I). In computation of signal and switching probabilities at output of the component (c), signal and switching probabilities at inputs of the component (c) may be provided from output(s) of component(s) in a preceding stage or from primary inputs of the circuit, other than using the signal and switching probabilities estimated in step 6H.

Next, component power ($P_c$) consumed by the component (c) is computed using the signal and switching probabilities at output of the component (c) obtained in step 6I and the power rules provided in step 6C (step 6J). Signal and switching probabilities at inputs of other components which are connected to the output of the component (c), are updated with the signal and switching probabilities at output of the component (c) (step 6K). Then, the component (c) is marked as processed, and the component power ($P_c$) computed in step 6J is added to a total power computed for the circuit (step 6L). The total power consumed in the circuit is obtained by accumulating component powers consumed by components of the circuit.

In the process of estimating power consumed by components of a circuit, accuracy of the estimation of signal and switching probabilities in step 6H may be improved by providing feedback loops to the circuit, whereby improving the estimation of power consumed in the circuit. It is also noted that the order of the steps of the flow chart in FIG. 6 should not be construed in a restrictive manner. For example, the step of updating signal and switching probabilities of other components may be performed prior to the step of computing the component power ($P_c$).

By using the method for computing and propagating signal and switching probabilities according to the present invention, the method of estimating power consumed in a circuit is enhanced in its speed over conventional methods for computing power consumption. The method for computing and propagating signal and switching probabilities of the present invention is also useful for power optimization in tools, such as CAD tools.

Figure 7:
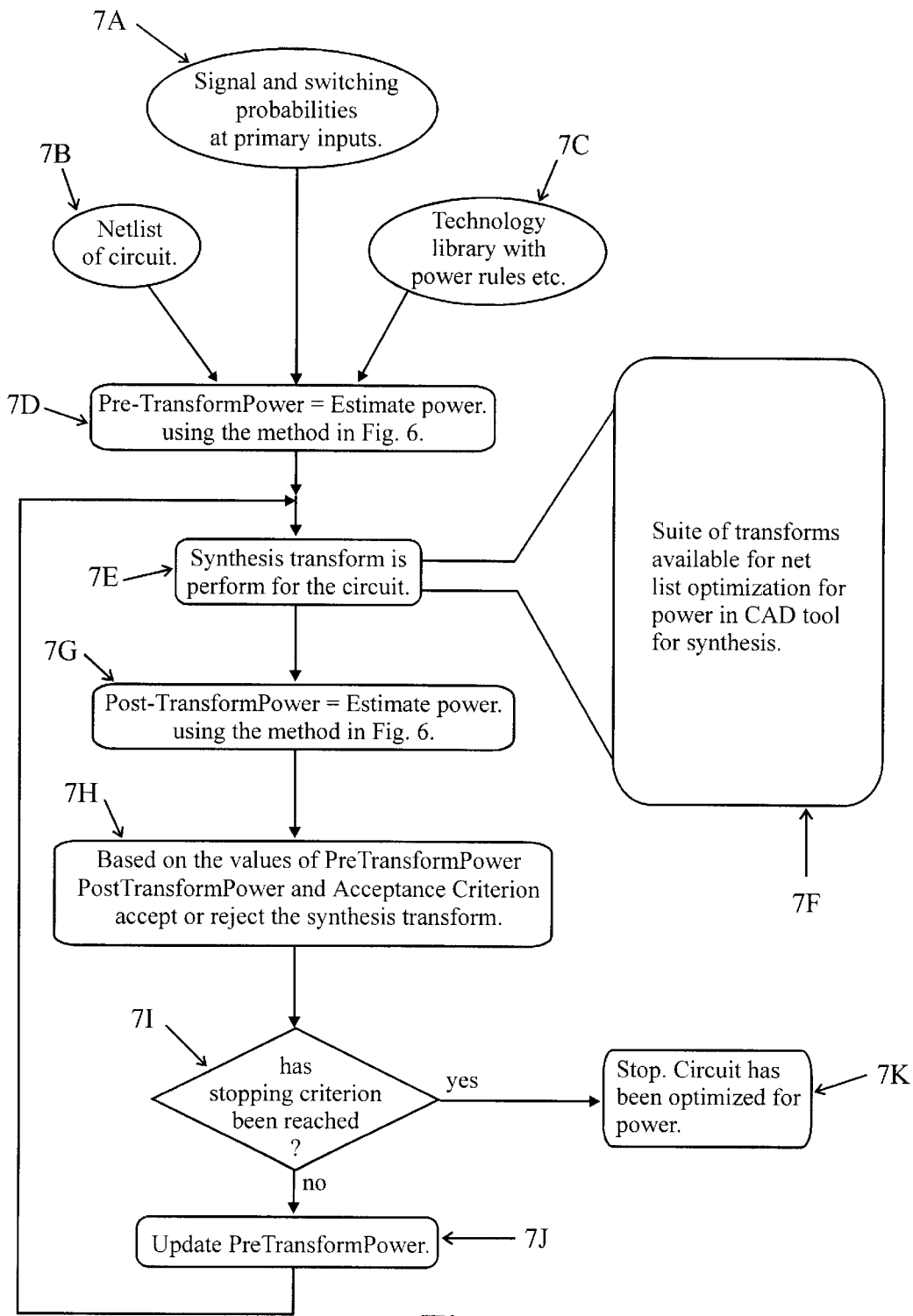
FIG. 7 is a flow chart describing a method of optimizing power consumed in a circuit according to the present invention.

Referring to FIG. 7, there is provided a flow chart for describing a method of optimizing power consumed in a circuit using the method of power estimation according to the present invention, which is described above referring to FIG. 6. Initial inputs provided for a power optimization process are similar to the initial inputs for the power estimation process. The initial inputs for power optimization in a circuit includes signal and switching probabilities at primary inputs of the circuit (step 7A), a net list of the circuit (step 7B), and technology library containing various technology dependent information, such as power rules and characteristics of components in the circuit (step 7C). With the initial inputs provided in steps 7A–7C, power consumed in the circuit is estimated using the method of power estimation according to the present invention, which is described above referring to FIG. 6 (step 7D). The power estimated in step 7D is called pre-transform power because the estimation of power is performed prior to performing a synthesis transform with respect to the circuit.

Upon obtaining the pre-transform power in step 7D, a synthesis process is performed to optimize performance of the circuit (step 7E). In the synthesis process for the circuit, a net list of the circuit is created from specification of the circuit in a register transfer level which is a higher level language or a higher level net list of the circuit. In the register level synthesis, various optimization processes are performed on the higher level net list to ensure that the circuit meets its performance goals with respect to power, area, delay, etc. of the circuit. The optimization processes involve changing the net list without changing output behavior of the circuit. Such a change is referred to as "synthesis transform". In other words, the synthesis process is performed in association with a suite of transforms available for the net list optimizing power in the circuit such as a CAD tool (step 7F). In the process of register transfer level synthesis, a synthesis transform based on signal and/or switching probabilities can be used so that the optimization for the circuit is based on a power aware objective function.

Upon performing the synthesis process to optimize the performance goals of the circuit in steps 7E and 7F, the process of power estimation is performed with respect to the optimized circuit using the method of the present invention described above referring to FIG. 6 (step 7G). Since the power estimation is performed after the synthesis process, the power estimated in step 7G is called post-transform power. The synthesis transform resulting from the synthesis process is accepted or rejected based on values of the pre-transform power and the post-transform power and a predetermined acceptance criterion (step 7H). Then, it is determined whether a stopping criterion has been reached (step 7I). If the stopping criterion has been reached, the circuit has been optimized for power (7K). On the other hand, if the stopping criterion has not been reached in step 7I, the pre-transform power is updated with the post-transform power (step 7J) and the optimization process goes back to step 7E to perform the synthesis process for the circuit with the updated pre-transform power. Thus, the iterative loop formed of steps 7E through 7J is repeatedly performed until the stopping criterion has been reached.

Having described preferred embodiments of the method for computing and propagating signal and switching probabilities and the method for estimating and optimizing power consumed in a circuit according to the present invention, modifications and variations can be readily made by those skilled in the art in light of the above teachings. It is therefore to be understood that, within the scope of the appended claims, the present invention can be practiced in a manner other than as specifically described herein.

What is claimed is:

1. A method for computing switching probability at an output of a logic circuit having a plurality of inputs and a predetermined function, the method comprising the steps of:

providing signal and switching probabilities at the plurality of inputs;

creating a switching table having a plurality of entries each of which represents a transition status of a signal at the output of the circuit operating in accordance with the predetermined function;

computing event probabilities with respect to each of the plurality of entries, wherein the event probabilities include a first event probability representing a probability of event that a signal at an input of the circuit switches, a second event probability representing a probability of event that a signal at an input of the circuit does not switch and is at a first value, and a third event probability representing a probability of event that a signal at an input of the circuit does not switch and is at a second value; and accumulating the event probabilities computed with respect to the plurality of entries to produce the switching probability at the output of the circuit.

2. The method of claim 1, wherein the step of computing event probabilities is performed with respect to entries each representing that there is a transition in a signal at the output of the circuit.

3. The method of claim 1, wherein the step of computing event probabilities is performed with respect to entries each representing that there is no transition in a signal at the output of the circuit.

4. The method of claim 3, further including the step of subtracting from one (1) a value obtained by the step of accumulating the event probabilities, whereby producing the switching probability at the output of the circuit.

5. The method of claim 1, wherein the switching table includes:

a plurality of input signal values each of which is determined by values of the plurality of inputs; and a plurality of switching values each of which is determined by switching status of each of the plurality of inputs, wherein each of the plurality of entries is determined by corresponding input signal value and switching value.

6. The method of claim 5, wherein each of the plurality of switching values is represented with binary bits and the step of computing the first event probability includes the steps of:

setting each of the binary bits of a switching value to a predetermined logic value depending on switching status of a corresponding one of the plurality of inputs;

detecting binary bits each having a predetermined logic value representing a switching at a corresponding one of the plurality of inputs;

assigning an event probability of occurrence of the switching with respect to each of the binary bits detected; and multiplying event probabilities each of which is assigned to a corresponding one of the binary bits detected, whereby producing the first event probability.

7. The method of claim 6, wherein the event probability of occurrence of the switching is represented by "$q_i/2 (i=1, 2, \ldots, n)$", wherein "$q_i$" represents a probability that the corresponding one of the plurality of inputs i (i=1, 2, ... n) switches.

8. The method of claim 6, wherein each of the plurality of input signal values is represented with binary bits and the step of computing the second event probability includes the steps of:

detecting binary bits each having a predetermined logic value representing that a signal at a corresponding one of the plurality inputs does not switch;

detecting binary bits each having a logic high;

assigning an event probability to each of the binary bits detected, the event probability representing a probability of event that a signal at an input corresponding to each of the binary bits detected does not switch and is at the logic high; and multiplying event probabilities each of which is assigned to a corresponding one of the binary bits detected, whereby producing the second event probability.

9. The method of claim 8, wherein the event probability assigned to each of the binary bits detected is represented by "$p_i-q_i/2 (i=1, 2, \ldots, n)$", wherein "$p_i$" and "$q_i$" represent probabilities that a signal at one of the plurality of inputs i (i=1, 2, ..., n) is at logic high and switches, respectively.

10. The method of claim 8, wherein the step of computing the third event probability includes the steps of:

detecting binary bits each having a logic low;

assigning an event probability to each of the binary bits detected, the event probability representing a probability of event that a signal at an input corresponding to each of the binary bits detected does not switch and is at the logic low; and multiplying event probabilities each of which is assigned to a corresponding one of the binary bits detected, whereby producing the third event probability.

11. The method of claim 10, wherein the event probability assigned to each of the binary bits detected is represented by "$1-p_i-q_i/2 (i=1, 2, \ldots, n)$", wherein "$p_i$" and "$q_i$" represent probabilities that a signal at one of the plurality of inputs i (i=1, 2, ..., n) is at logic high and switches, respectively.

12. The method of claim 5, wherein the step of creating the switching table includes the steps of:

selecting one of the plurality of entries;

computing a pre-switching value of the selected entry, wherein the pre-switch value is determined by the predetermined function and one of the plurality of input signal values corresponding to the selected entry;

switching the one of the plurality of input signal values in accordance with one of the plurality of switching values corresponding to the selected entry to produce a switched input signal value;

computing a post-switch value of the selected entry, wherein the post-switch value is determined by the predetermined function and the switched input signal value;

comparing the pre-switch value with the post-switch value; and assigning a first predetermined value to the selected entry when the pre-switch value and the post-switch value are equal to each other, and a second predetermined value to the selected entry when the pre-switch value and the post-switch value are different from each other.

13. The method of claim 12, further including the step of creating a truth table for the circuit in accordance with the predetermined function.

14. The method of claim 12, wherein the step of switching the input signal value includes the steps of:

representing the input signal value and the switching value with binary bits; and changing a binary bit of the input signal value to an inverse of the binary bit when a corresponding binary bit of the switch value indicates a switching.

15. The method of claim 14, wherein the step of computing a pre-switch value includes the steps of:

providing the binary bits of the input signal value to the plurality of inputs of the circuit, each of the binary bits of the input signal value being input to a corresponding one of the plurality of inputs;

processing the binary bits received by the plurality of inputs in accordance with the predetermined function; and generating the pre-switch value as a result of the processing, the pre-switch value having binary bits.

16. The method of claim 14, wherein the step of computing a post-switch value includes the steps of:

providing binary bits of the switched input signal value to the plurality of inputs of the circuit, each of the binary bits of the switched input signal value being input to a corresponding one of the plurality of inputs;

processing the binary bits of the switched input signal value received by the plurality of inputs in accordance with the predetermined function; and generating the post-switch value as a result of the processing, the post-switch value having binary bits.

17. The method of claim 12, wherein the switching table has $2^n \times 2^n$ entries when the circuit has "n" inputs which have two (2) kinds of values.

18. The method of claim 1, further including the step of computing a signal probability at the output of the circuit, comprising the steps of:

creating a truth table for the circuit in accordance with the predetermined function, the truth table having a plurality of entries corresponding to signals at the plurality of inputs, respectively;

choosing in sequence one of entries each of which has a predetermined value representing that a signal at the output of the circuit switches;

determining whether a signal at one of the plurality of inputs corresponding to the entry chosen is at logic high;

assigning to the signal at the one of the plurality of inputs an event probability representing a probability of event that the signal is at logic high, when the signal is determined to be at logic high; and accumulating event probabilities assigned to signals at inputs corresponding to entries chosen, respectively, whereby producing the signal probability at the output of the circuit.

19. The method of claim 18, wherein the step of assigning an event probability includes the steps of:

assigning "$p_i$ (i=1, 2, . . . , n)" when the signal is at logic high, "$p_i$" representing a probability of event that a signal i at one of the plurality of inputs i (i=1, 2, . . . , n) is at logic high; and assigning "$1-p_i$ (i=1, 2, . . . , n)" when the signal is at logic low.

20. The method of claim 18, wherein the steps of computing switching probability and computing signal probability are applied to a network having a plurality of logic circuits, wherein signal and switching probabilities at output of a logic circuit are provided to an input of another logic circuit connected to the logic circuit.

21. The method of claim 20, further including the step of estimating power consumed in the network, comprising the steps of:

providing characteristics of each of the logic circuits;

computing the signal and switching probabilities at output of each of the logic circuits;

estimating a component power for each of the logic circuits with the characteristics provided and the signal and switching probabilities computed; and accumulating component powers estimated for the logic circuits, respectively, to produce the power consumed in the network.

22. The method of claim 21, further including the step of providing signal and switching probabilities at primary inputs of the network.

23. The method of claim 21, further including the step of estimating signal and switching probabilities at inputs of a logic circuit from signal and switching probabilities computed at a precedent stage, when the logic circuit receives no signal and switching probabilities from another logic circuit.

24. The method of claim 21, wherein the step of computing the signal and switching probabilities includes the step of choosing one from the logic circuits in sequence, the chosen one has least number of inputs among the logic circuits.

25. The method of claim 21, further including the step of optimizing power consumed in the network, comprising the steps of:

estimating a pre-transform power for the network using the step of estimating power;

performing synthesis transform with respect to each of the logic circuits in the network;

estimating a post-transform power for the network using the step of estimating the power, upon the synthesis transform being performed; and accepting the synthesis transform based on values of the pre-transform power and the post-transform power estimated.

26. The method of claim 25, further including the step of updating the pre-transform power with the post-transform power until a stopping criterion is reached, whereby producing an optimized power for the network.

27. The method of claim 25, wherein the synthesis transform is performed in association with a suite of transforms available for a net list optimizing power in each of the logic circuits.

28. A program storage device readable by a machine, tangibly embodying a program of instructions executable by the machine to perform method steps for managing a plurality of data points in a multi-dimensional space, the method comprising the steps of:

providing signal and switching probabilities at the plurality of inputs of the circuit;

creating a switching table having a plurality of entries each of which represents a transition status of a signal at output of the circuit operating in accordance with the predetermined function;

computing event probabilities with respect to each of the plurality of entries, wherein the event probabilities include a first event probability representing a probability of event that a signal at an input of the circuit switches, a second event probability representing a probability of event that a signal at an input of the circuit does not switch and is at a first value, and a third event probability representing a probability of event that a signal at an input of the circuit does not switch and is at a second value; and accumulating the event probabilities computed with respect to the plurality of entries to produce the switching probability at the output of the circuit.

29. The program storage device of claim 28, wherein the instructions for performing the step of computing event probabilities comprise instructions for performing computation of event probabilities with respect to entries each representing that there is a transition in a signal at the output of the circuit.

30. The program storage device of claim 28, wherein the instructions for performing the step of computing event probabilities comprise instructions for performing the steps of:

computing the event probabilities with respect to entries each representing that there is no transition in a signal at the output of the circuit; and subtracting from one (1) a value obtained by the step of accumulating the event probabilities, whereby producing the switching probability at the output of the circuit.

31. The program storage device of claim 28, wherein the switching table has input signal values each being determined by values of the plurality of inputs and switching values each being determined by switching status of each of the plurality of inputs, and the instructions for performing the step of computing the first event probability comprise instructions for performing the steps of:

setting each of binary bits representing a switching value to a predetermined logic value depending on switching status of a corresponding one of the plurality of inputs;

detecting binary bits each having a predetermined logic value representing a switching at a corresponding one of the plurality of inputs;

assigning an event probability of occurrence of the switching with respect to each of the binary bits detected; and accumulating event probabilities each of which is assigned to a corresponding one of the binary bits detected, whereby producing the first event probability.

32. The program storage device of claim 31, wherein the instructions for performing the step of creating a switching table comprise instructions for performing the steps of:

selecting one of the plurality of entries;

computing a pre-switching value of the selected entry, wherein the pre-switch value is determined by the predetermined function and one of the input signal values corresponding to the selected entry;

switching the one of the input signal values in accordance with one of the switching values corresponding to the selected entry to produce a switched input signal value;

computing a post-switch value of the selected entry, wherein the post-switch value is determined by the predetermined function and the switched input signal value;

comparing the pre-switch value with the post-switch value; and assigning a first predetermined value to the selected entry when the pre-switch value and the post-switch value are equal to each other, and a second predetermined value to the selected entry when the pre-switch value and the post-switch value are different from each other.

33. The program storage device of claim 28, further including instructions for performing the step of computing a signal probability at the output of the circuit, comprising instructions for performing the steps of:

creating a truth table for the circuit in accordance with the predetermined function, the truth table having a plurality of entries corresponding to signals at the plurality of inputs, respectively;

choosing in sequence one of entries each of which has a predetermined value representing that a signal at the output of the circuit switches;

determining whether a signal at one of the plurality of inputs corresponding to the entry chosen is at logic high;

assigning to the signal at the one of the plurality of inputs an event probability representing a probability of event that the signal is at logic high, when the signal is determined to be at logic high; and accumulating event probabilities assigned to signals at inputs corresponding to entries chosen, respectively, whereby producing the signal probability at the output of the circuit.

34. The program storage device of claim 28, further comprising instructions for applying the steps of computing switching probability and computing signal probability in a network having a plurality of logic circuits, wherein signal and switching probabilities at output of a logic circuit are provided to an input of another logic circuit connected to the logic circuit.

35. The program storage device of claim 34, further comprising instructions for performing the step of estimating power consumed in the network, including instructions for performing the steps of:

providing characteristics of each of the logic circuits;

computing the signal and switching probabilities at output of each of the logic circuits;

estimating a component power for each of the logic circuits with the characteristics provided and the signal and switching probabilities computed; and accumulating component powers estimated for the logic circuits, respectively, to produce the power consumed in the network.

* * * * *